United States Patent
van Cayzeele et al.

(10) Patent No.: US 7,063,333 B2
(45) Date of Patent: Jun. 20, 2006

(54) METHOD AND DEVICE FOR RIDE HEIGHT CONTROL OF A MOTOR VEHICLE

(75) Inventors: Patricio van Cayzeele, Braunschweig (DE); Martin Fischer, Wolfsburg (DE); Norbert Fischer, Barwedel (DE)

(73) Assignee: Volkswagen AG, Wolfsburg (DE)

( * ) Notice: Subject to any disclaimer, the term of this patent is extended or adjusted under 35 U.S.C. 154(b) by 25 days.

(21) Appl. No.: 10/317,822

(22) Filed: Dec. 12, 2002

(65) Prior Publication Data
US 2003/0139861 A1    Jul. 24, 2003

(30) Foreign Application Priority Data
Dec. 13, 2001    (DE)    ............................. 101 62 172

(51) Int. Cl.
*B60G 17/01* (2006.01)
(52) U.S. Cl. ................. 280/5.501; 280/5.514; 180/179
(58) Field of Classification Search .......... 280/5.501, 280/5.514, 6.157, 6.158; 180/171, 179; 701/37, 701/93; 340/438, 441
See application file for complete search history.

(56) References Cited

U.S. PATENT DOCUMENTS

| | | | | | |
|---|---|---|---|---|---|
| 4,616,847 | A | * | 10/1986 | Kanai et al. | 280/5.514 |
| 4,696,483 | A | * | 9/1987 | Takizawa et al. | 280/5.514 |
| 5,452,919 | A | * | 9/1995 | Hoyle et al. | 280/5.514 |
| 5,466,007 | A | * | 11/1995 | Smith | 280/5.514 |
| 5,652,486 | A | * | 7/1997 | Mueller et al. | 180/171 |
| 6,260,859 | B1 | * | 7/2001 | Dixon et al. | 280/5.514 |

FOREIGN PATENT DOCUMENTS

| | | |
|---|---|---|
| DE | 198 11 809 | 9/1999 |
| EP | 1 162 092 | 12/2001 |

* cited by examiner

*Primary Examiner*—David R. Dunn
(74) *Attorney, Agent, or Firm*—Kenyon & Kenyon LLP

(57) ABSTRACT

In a method and a device of a motor vehicle, including regulating units for adjusting the level position of a motor vehicle, at least one control unit for activating the regulating units, at least one sensor mechanism for recording the actual level position of the motor vehicle and a device for setting a setpoint level position of the motor vehicle, the actual level position being adapted to the actual speed of the motor vehicle regarding driving dynamics, whereby a set setpoint level position is able to be fixed, a limiting speed $V_{limit}$ regarding driving dynamics is able to be assigned to the setpoint level position, and this limiting speed is not able to be exceeded.

9 Claims, 2 Drawing Sheets

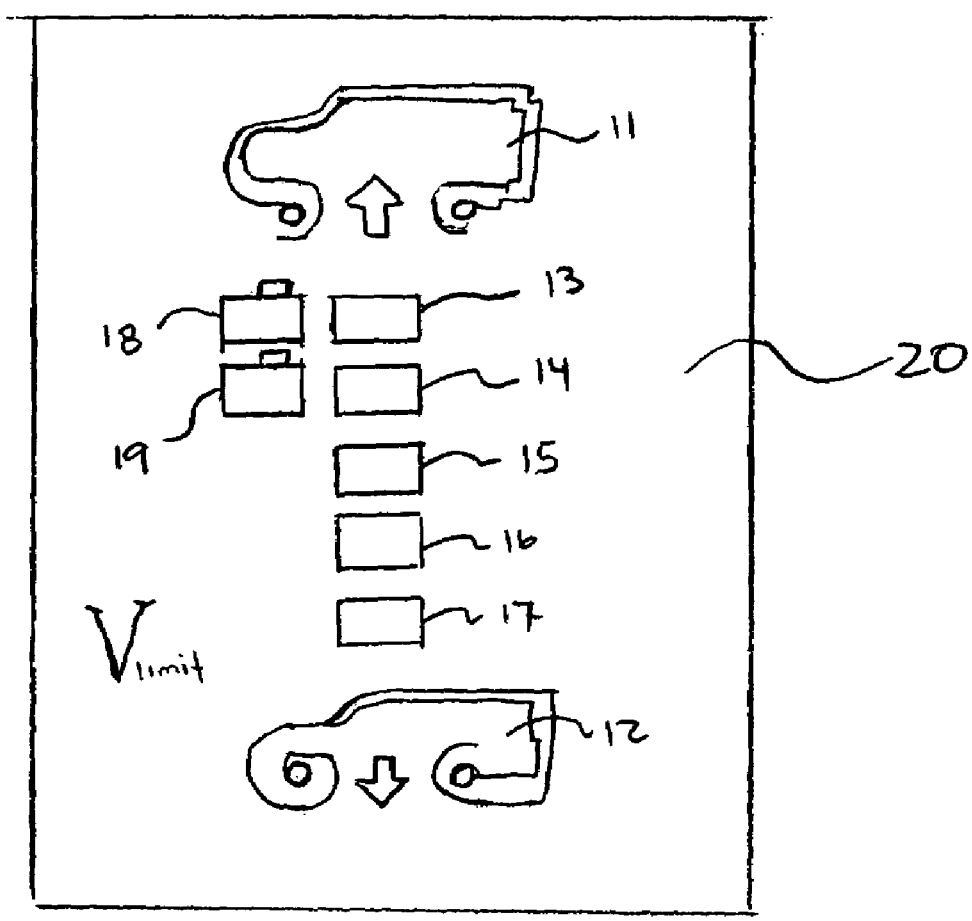

METHOD AND DEVICE FOR RIDE HEIGHT CONTROL OF A MOTOR VEHICLE

CROSS-REFERENCE TO RELATED APPLICATIONS

The present application claims priority from Application No. 101 62 172.8, filed in the Federal Republic of Germany on Dec. 13, 2001.

FIELD OF THE INVENTION

The present invention relates to a method and a device for ride height control of a motor vehicle.

BACKGROUND INFORMATION

Modern motor vehicles, and particularly off-highway vehicles, are designed using automatic ride height controls, so as, for instance, to compensate for level differences caused by street or terrain unevenness. To do this, the ride height control includes regulating units, for adapting the level position of a motor vehicle, which, for example, are designed as air springs and are driven by a compressor. In addition, the ride height control includes inclination and/or distance sensors for recording the distance to the roadway foundation. The data of this sensor technology are evaluated by a control unit, and the compressor is driven such that it activates the air springs so that a level position set as the setpoint value is adjusted to. At higher level positions the problem arises that the center of gravity of the motor vehicle is shifted upwards. At higher motor vehicle speeds, this in turn leads to a stability problem, so that there is the danger of rollover of the motor vehicle. To avoid this problem, the automatic ride height control records the motor vehicle speed, and when a boundary speed is exceeded, it automatically adjusts to a lower level, in order to achieve again a sufficient stability.

In the conventional automatic ride height controls it is a disadvantage that the compressors are frequently stressed unnecessarily, which lowers the service life of the compressors and generally the activating members of the regulating units, and represents unnecessary noise pollution for the driver.

It is therefore an object of the present invention to provide a method and a device for the automatic ride height control for a motor vehicle, by which the activating members of the regulating units are less strongly stressed.

SUMMARY

The above and other beneficial objects of the present invention are achieved by providing a method and a device as described herein.

To accomplish this, a set setpoint level position is able to be fixed, a limiting speed $V_{limit}$ regarding driving dynamics being associated with the fixed setpoint level position, which is not able to be exceeded. Thus, in the limit range of driving dynamics, it is not the level position, but the speed that is limited, the driver, however, always having available the full preselected ground clearance. In this context, this fixing or "locking" leads to a substantially lower stressing of the activating members and a greater overall convenience. This will now be explained by an exemplary situation compared to the conventional arrangement. Conventionally, if the driver briefly exceeds the limiting speeds, the level position is automatically adjusted downwards. However, if he subsequently needs the level position set to begin with, he has to wait until the ride height control has once again reached the level set to begin with, which may be done automatically or manually. Having to wait like that is a nuisance, and the activating member is stressed. Since, according to the present invention the limiting speed is not able to be exceeded, no critical driving dynamics may arise, and no readjustment may have to be made.

Alternatively, a set setpoint level position may be adjusted and fixed, and after the fixing, the ride height control is deactivated. A situation in which this alternative becomes positively noticeable is, for instance, when driving through an alternating hill and valley section. On trips through terrain or on an uneven roadway, an automatic ride height control tries all the time to compensate at the individual wheels for the standing height differences. When there is changing spring deflection in response to driving through an alternating hill and valley section, because of the adjustments, it may happen from one moment to the next that the standing height differences are exactly opposite to what is required, i.e., a just corrected ground clearance at one wheel will be too low there at the next moment. The ride height control therefore makes no sense and leads exclusively to a powerful stressing of the activating members. According to the present invention, after an initial adjustment the vehicle remains at a certain level, so that the driver may adjust himself to a corresponding ground clearance which will no longer change as a result of control actions in the meantime. Thus, the vehicle reacts to the pushing of a button as would a vehicle having an unregulated chassis. Partially uninterrupted control actions of the system, which yield no advantage in the terrain, may thus be avoided, which otherwise may lead to overheating of the activating members and automatic switching off. In this context, by adjustment of the setpoint level position is also understood a process in which an actual level position is taken over as the setpoint level position. In this connection, a limiting speed may be assigned even in this alternative of the set and fixed setpoint level position. The device according to the present invention for ride height control may also have the driving dynamics adaptation of the actual ride height control to the actual speed, so that a choice may be made between the three operating types a) the adaptation regarding the driving dynamics of the actual level position to the actual speed,
b) the limiting speed regarding driving dynamics having an active ride height control to a fixed setpoint level position or
c) fixing a set and adjusted setpoint level position using deactivated ride height control, the last operating type being especially suitable, e.g., for offroad vehicles. However, example embodiments having in each case only one or two or three operating types are possible.

In one example embodiment of the present invention, the regulating units may be designed as air springs, and the activating members as compressors.

In a further example embodiment of the present invention, the limiting of the speed may take place by an engine control unit and/or an electrical stability program, since the speed may be limited very easily therein, or the limiting speeds for the level positions are already connected.

In a further example embodiment of the present invention, the limiting speed, which he may not exceed, is displayed for the driver, so that he may adjust himself to it and adapt his driving behavior accordingly.

The present invention is described below on the basis of an exemplary embodiment.

BRIEF DESCRIPTION OF THE DRAWINGS

FIG. 2 is a schematic view of an exemplary display of a set level position.

DETAILED DESCRIPTION

Figure 1:
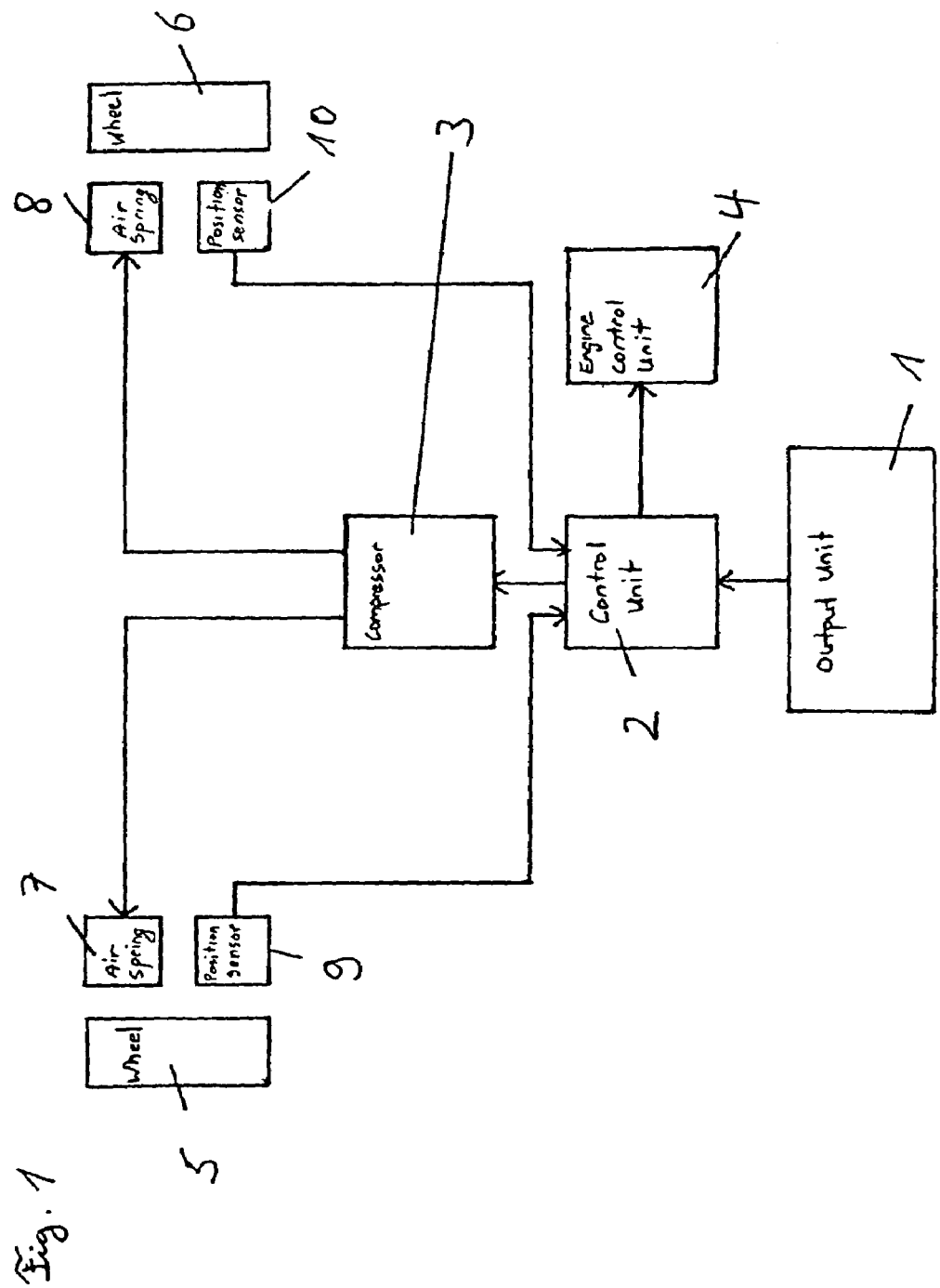
FIG. 1 is a schematic block diagram of a device for automatic ride height control.

The device for automatic ride height control includes an input and output unit 1, a control unit 2, a compressor 3, an engine control unit 4, the vehicle wheels 5, 6 having associated air springs 7, 8, and position sensors 9, 10 associated with vehicle wheels 5, 6.

The driver is able to set and possibly fix a desired setpoint level position via input and output unit 1, which will be explained in greater detail below. In addition, the driver may have the set level position displayed to himself. The set setpoint level position is transmitted to control unit 2 via input and output unit 1. Control unit 2 ascertains from the data of position sensors 9, 10 the actual level position and activates compressor 3 accordingly, which inflates air springs 7, 8 accordingly or is caused to inflate them, so that the desired setpoint level position is reached. In order to give the driver the possibility of loading compressor 3 less strongly or to rely situationally on a certain ground clearance, he may fix or lock a selected setpoint level position.

In FIG. 2, an exemplary display 20 for indicating the set setpoint level position is illustrated, the display 20 being able to be designed, e.g., as a touch screen, thus simultaneously acting as an input unit.

The display 20 includes pictograms of a vehicle, an upward arrow being assigned to upper pictogram 11 and a downward arrow being assigned to bottom pictogram 12. Between the two pictograms 11, 12, fields 13 to 17 are assigned which symbolize different level positions. In this context, field 13 symbolizes the level position "offroad," field 14 the level position "high," field 15 the level position "normal," field 16 the level position "low" and field 17 the level position "loaded," the current level position in each case being optically highlighted. Because of the device between the two pictograms 11, 12, the driver thus also has visual information on the set level position. Additional fields 18, 19 are situated next to fields 13 and 14. These fields 18, 19 symbolize as to whether the respective level position "offroad" or "high" is locked. The display 20 may also display a limiting speed of the vehicle, as detailed below.

If the setpoint level position "high" is set, the adaptation regarding driving dynamics of the actual level position to the actual speed is able to take place. Thus, if the set level position may lead to instability at the actual speed, then the actual level position is regulated down.

Now, if, for example, the setpoint level position "high" is locked, field 19 is correspondingly optically highlighted. In addition, this control command is transmitted to control unit 2 and from there to engine control unit 4, or directly to engine control unit 4. On the basis of this control command, engine control unit 4 limits the speed of the motor vehicle to a limiting speed $V_{limit}$ regarding driving dynamics at which the motor vehicle is still stable in conjunction with the selected level position. Since the limiting speed regarding driving dynamics thus may not be exceeded, it is also not necessary to adjust the level position for driving dynamics reasons, which may load compressor 3.

At level position "offroad" a certain level position, which the driver has set, may be locked. After an initial adjustment, the vehicle remains at a certain level, so that the driver may adjust himself to the corresponding ground clearance which may no longer change as a result of control actions in the meantime. Thus, the vehicle reacts as may a vehicle having an unregulated chassis. In this context, a limiting speed may also be assigned to the locked level position, this, however, not being necessary in the regulating case. In addition, the limiting speed for the selected level position "offroad" may then not be equal to the limiting speed at the locked level position "high".

What is claimed is:

1. A device for ride height control of a motor vehicle, comprising:
   regulating units configured to adjust a level position of the motor vehicle;
   at least one control unit configured to activate the regulating units;
   at least one sensor mechanism configured to record an actual level position of the motor vehicle; and
   a device configured to set a setpoint level position of the motor vehicle,
   wherein the ride height control device is configured to selectively:
      fix a set setpoint level position and assign a limiting speed in accordance with driving dynamics to the setpoint level position, the limiting speed not being exceedable; and
      adjust to and fix a set setpoint level position and deactivate the ride height control after fixing.

2. The device according to claim 1, wherein the regulating units include air springs.

3. The device according to claim 2, further comprising a compressor assigned to the air springs.

4. A device for ride height control of a motor vehicle, comprising:
   regulating units configured to adjust a level position of the motor vehicle;
   at least one control unit configured to activate the regulating units;
   at least one sensor mechanism configured to record an actual level position of the motor vehicle; and
   a device configured to set a setpoint level position of the motor vehicle,
   wherein the ride height control device is configured to selectively:
      (i) fix a set setpoint level position and assign a limiting speed in accordance with driving dynamics to the setpoint level position, the limiting speed not being exceedable, at least one of an engine control device and an electrical stabilization program configured to perform a limit to the limiting speed; and
      (ii) adjust to and fix a set setpoint level position and to deactivate the ride height control after fixing.

5. A device for ride height control of a motor vehicle, comprising:
   regulating units configured to adjust a level position of the motor vehicle;
   at least one control unit configured to activate the regulating units;
   at least one sensor mechanism configured to record an actual level position of the motor vehicle; and
   a device configured to set a setpoint level position of the motor vehicle, wherein the ride height control device is configured to selectively:
(i) fix a set setpoint level position and assign a limiting speed in accordance with driving dynamics to the setpoint level position, the limiting speed not being exceedable, the device for ride height control including a display unit configured to display the limiting speed for the set setpoint level position; and
(ii) adjust to and fix a set setpoint level position and to deactivate the ride height control after fixing.

6. A method for ride height control of a motor vehicle in accordance with regulating units configured to adjust a level position of the motor vehicle, at least one control unit configured to activate the regulating units, at least one sensor mechanism configured to record an actual level position of the motor vehicle and a device configured to set a setpoint level position of the motor vehicle, comprising:
inputting and fixing a desired setpoint level position by the device configured to set the setpoint level position;
ascertaining a limiting speed in accordance with the fixed setpoint level position; and
regulating an engine of the motor vehicle below the limiting speed.

7. A method for ride height control of a motor vehicle in accordance with regulating units configured to adjust a level position of the motor vehicle and compensate for level differences caused by riding surface unevenness, at least one control unit configured to activate the regulating units, at least one sensor mechanism configured to record an actual level position of the motor vehicle and a device configured to set a setpoint level position of the motor vehicle, comprising:
adjusting to a set and fixed setpoint level position;
deactivating the ride height control; and
limiting a speed of the motor vehicle in motion below a threshold speed so as to increase stability of the motor vehicle.

8. A device for ride height control of a motor vehicle, comprising:
regulating units configured to adjust a level position of the motor vehicle and compensate for level differences caused by riding surface unevenness;
at least one control unit configured to activate the regulating units;
at least one sensor mechanism configured to record an actual level position of the motor vehicle;
the device configured to set a setpoint level position of the motor vehicle and to adjust to and fix a set setpoint level position and to deactivate the ride height control after fixing, the device further configured to limit a speed of the motor vehicle in motion having a fixed setpoint level position below a threshold speed so as to increase stability of the motor vehicle.

9. A method for ride height control of a motor vehicle, comprising:
recording an actual level position of the motor vehicle by at least one sensor mechanism;
setting a setpoint level position of the motor vehicle;
activating regulating units by at least one control unit, said regulating units configured to adjust a level position of the motor vehicle and compensate for level differences caused by riding surface unevenness;
adjusting a level position of the motor vehicle in accordance with the regulating units to a set and fixed setpoint level position;
deactivating the ride height control; and
limiting a speed of the motor vehicle in motion below a threshold speed so as to increase stability of the motor vehicle.

* * * * *